(12) United States Patent
Taylor et al.

(10) Patent No.: US 8,836,508 B2
(45) Date of Patent: Sep. 16, 2014

(54) APPARATUS AND METHOD FOR SECURING A PORTABLE ELECTRONIC DEVICE

(71) Applicant: H4 Engineering, Inc., San Antonio, TX (US)

(72) Inventors: Scott K. Taylor, San Antonio, TX (US); Christopher T. Boyle, San Antonio, TX (US); Alexander G. Sammons, San Antonio, TX (US); Denes Marton, San Antonio, TX (US)

(73) Assignee: H4 Engineering, Inc., San Antonio, TX (US)

( * ) Notice: Subject to any disclaimer, the term of this patent is extended or adjusted under 35 U.S.C. 154(b) by 0 days.

(21) Appl. No.: 13/757,825

(22) Filed: Feb. 3, 2013

(65) Prior Publication Data
US 2013/0199251 A1    Aug. 8, 2013

Related U.S. Application Data

(60) Provisional application No. 61/594,926, filed on Feb. 3, 2012.

(51) Int. Cl.
*E05B 73/00* (2006.01)
*F16M 11/32* (2006.01)
*F16M 11/28* (2006.01)
*E05B 45/06* (2006.01)

(52) U.S. Cl.
CPC ......... *E05B 73/0082* (2013.01); *E05B 73/0005* (2013.01); *F16M 11/32* (2013.01); *E05B 2045/067* (2013.01); *F16M 11/28* (2013.01); *E05B 73/00* (2013.01)

USPC ......... 340/568.1; 52/155; 52/157; 52/745.21; 70/57; 70/57.1; 70/58; 70/62; 248/187.1; 248/156; 340/568.2; 340/571; 340/572.8; 340/572.9; 396/419

(58) Field of Classification Search
None
See application file for complete search history.

(56) References Cited

U.S. PATENT DOCUMENTS

| | | | |
|---|---|---|---|
| 4,683,729 A | 8/1987 | Rogers |
| 5,363,297 A | 11/1994 | Larson et al. |
| 5,457,370 A | 10/1995 | Edwards |
| 5,463,432 A | 10/1995 | Kahn |
| 5,491,632 A | 2/1996 | Pawlak et al. |

(Continued)

FOREIGN PATENT DOCUMENTS

| | | |
|---|---|---|
| EP | 0660131 A1 | 6/1995 |
| WO | 9517687 A1 | 6/1995 |

OTHER PUBLICATIONS

E. Calais, The Global Positioning System, Presentation Slides, available at date of publication unknown, available at URL web.ics.purdue.edu/~ecalais/teaching/geodesy/GPS_observables.pdf.

(Continued)

*Primary Examiner* — Benjamin C Lee
*Assistant Examiner* — Rajsheed Black-Childress
(74) *Attorney, Agent, or Firm* — Volk & McElroy, LLP; Michael D. Volk, Jr.

(57) ABSTRACT

Anti-theft protection systems and methods for portable devices, such as portable electronic devices, that are unattended during use. The anti-theft protection systems and methods use a combination of measures including mechanical aspects, such as tethering the device to an object that is difficult to move, and electronic aspects that detect unauthorized movement and or alarm the user or other responsible party if unauthorized movement occurs.

3 Claims, 8 Drawing Sheets

(56) References Cited

U.S. PATENT DOCUMENTS

| | | | |
|---|---|---|---|
| 5,640,007 A | 6/1997 | Talbott et al. | |
| 5,740,684 A * | 4/1998 | Sherlock et al. | 70/58 |
| 5,802,412 A | 9/1998 | Kahn | |
| 6,133,830 A * | 10/2000 | D'Angelo et al. | 340/571 |
| 6,519,860 B1 | 2/2003 | Bieg et al. | |
| 6,596,976 B2 | 7/2003 | Lin et al. | |
| 6,650,360 B1 | 11/2003 | Osen | |
| 6,690,978 B1 | 2/2004 | Kirsch | |
| 6,744,403 B2 | 6/2004 | Milnes et al. | |
| 6,771,213 B2 | 8/2004 | Durst et al. | |
| 6,867,799 B2 | 3/2005 | Broemmelsiek | |
| 6,952,646 B2 | 10/2005 | Chang | |
| 7,048,246 B2 * | 5/2006 | Leyden et al. | 248/551 |
| 7,239,975 B2 | 7/2007 | Coleman et al. | |
| 7,245,251 B2 | 7/2007 | Vogel et al. | |
| 7,349,008 B2 | 3/2008 | Rui et al. | |
| 7,365,771 B2 | 4/2008 | Kahn et al. | |
| 7,557,825 B2 | 7/2009 | Ishii et al. | |
| 7,591,195 B2 | 9/2009 | Puzio | |
| 7,672,781 B2 | 3/2010 | Churchill et al. | |
| 7,855,638 B2 | 12/2010 | Huston | |
| 7,986,225 B1 * | 7/2011 | Edelstein et al. | 340/521 |
| 8,106,772 B2 * | 1/2012 | Irmscher et al. | 340/568.1 |
| 8,297,857 B2 * | 10/2012 | Schippers | 396/428 |
| 2002/0005902 A1 | 1/2002 | Yuen | |
| 2002/0057217 A1 | 5/2002 | Milnes et al. | |
| 2002/0149681 A1 | 10/2002 | Kahn et al. | |
| 2003/0025614 A1 | 2/2003 | Kahn | |
| 2003/0081953 A1 * | 5/2003 | Wei | 396/428 |
| 2004/0006424 A1 | 1/2004 | Joyce et al. | |
| 2004/0105010 A1 | 6/2004 | Osen | |
| 2004/0119716 A1 | 6/2004 | Park et al. | |
| 2005/0051683 A1 * | 3/2005 | Young | 248/187.1 |
| 2005/0083433 A1 | 4/2005 | Wishart et al. | |
| 2005/0134458 A1 | 6/2005 | Leyden et al. | |
| 2006/0045613 A1 | 3/2006 | Leyden et al. | |
| 2006/0097875 A1 * | 5/2006 | Ott | 340/572.1 |
| 2006/0152365 A1 * | 7/2006 | Kim | 340/571 |
| 2007/0146484 A1 | 6/2007 | Horton et al. | |
| 2007/0283732 A1 * | 12/2007 | Soudan | 70/63 |
| 2008/0001022 A1 | 1/2008 | Sa et al. | |
| 2008/0192116 A1 | 8/2008 | Tamir et al. | |
| 2008/0266089 A1 * | 10/2008 | Haren et al. | 340/568.1 |
| 2008/0271220 A1 | 11/2008 | Chilton et al. | |
| 2009/0028386 A1 | 1/2009 | Michimoto et al. | |
| 2009/0145371 A1 | 6/2009 | Kramer | |
| 2009/0267895 A1 | 10/2009 | Bunch | |
| 2010/0026809 A1 | 2/2010 | Curry | |
| 2010/0191651 A1 | 7/2010 | Irmscher et al. | |
| 2011/0005148 A1 * | 1/2011 | Foster | 52/157 |
| 2011/0050878 A1 | 3/2011 | Wells et al. | |
| 2011/0228098 A1 | 9/2011 | Lamb et al. | |
| 2012/0269386 A1 | 10/2012 | Hankins et al. | |

OTHER PUBLICATIONS

Gibbings et al., Assessing the Accuracy and Integrity of RTK GPS Beneath High Voltage Power Lines, 2001—A Spatial Odyssey: 42nd Australian Surveyors Congress, date of publication unknown, available at URL eprints.usq.edu.au/2606/1/gibbings.pdf.

Oncore, Chapter 2 GPS Principles, date of publication unknown, available at URL gpsd.berlios.de/vendor-docs/motorola/ch2.pdf.

Dana M. Sommer, Principles of GPS, Presentation Slides, date of publication unknown, available at URL des.memphis.edu/esra/.../Principles%20of%20GPS%204-13-04.pdf.

Kaplan et al., Understanding GPS Principles and Applications, book, 2006, Artech House, available at URL http://www.bdu.ac.in/ckr/uploads/Earth/GPS%20FULL%20All%20in%201.pdf.

Clifford et al., Measuring Tilt with Low-g Accelerometers, Freescale Semiconductor Application Note, May 2005, Freescale Semiconductor, available at URL http://classes.cecs.ucf.edu/seecsseniordesign/su2006fa2006/g09/files/patrick/measuring%20tilt%20with%20low-g%20accelerometers.pdf.

Kimberly Tuck, Tilt Sensing Using Linear Accelerometers, Freescale Semiconductor Application Note, Jun. 2007, Freescale Semiconductor, available at URL http://www.mh-hannover.de/fileadmin/zentrale_einrichtungen/zentrale_forschungswerkst/downloads/AN3461.pdf.

Barwani et al., Vehicle Dynamics Lab GPS Tracking Camera Turret, web site, 2009, available at URL http://www.me.berkeley.edu/ME102B/Past_Proj/f09/17%20GPS%20Camera%20Turret%20Website/Home.html.

* cited by examiner

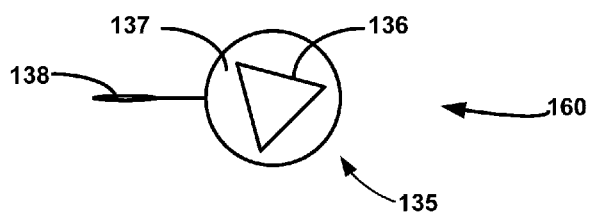
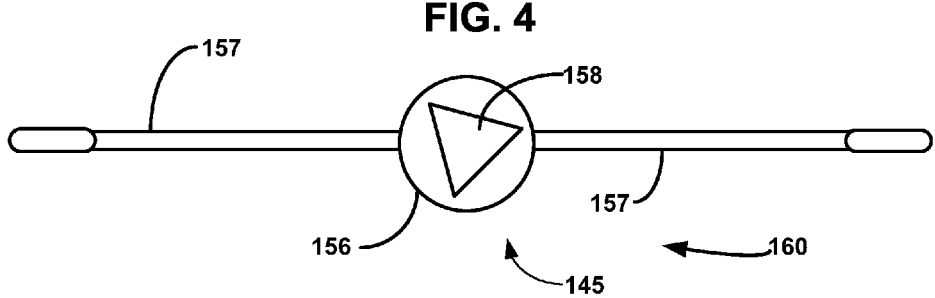
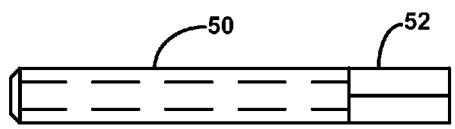
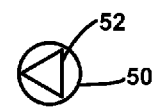
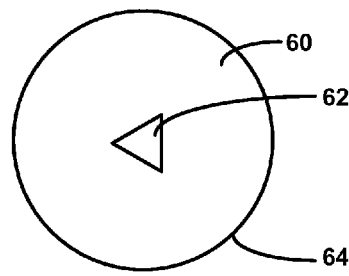

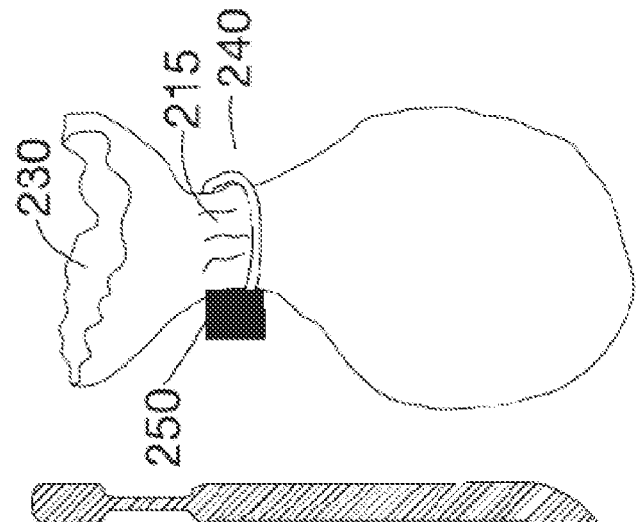
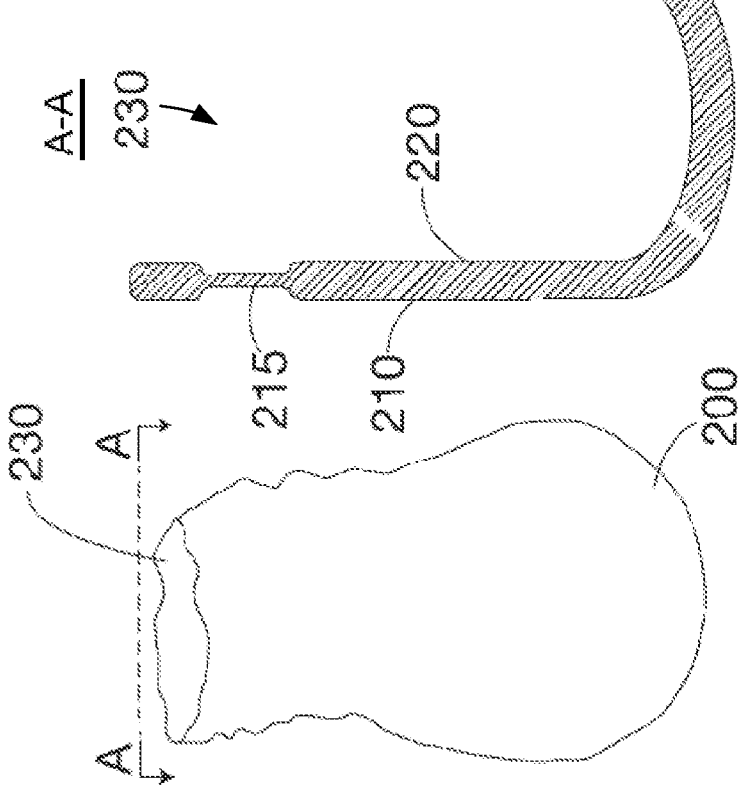

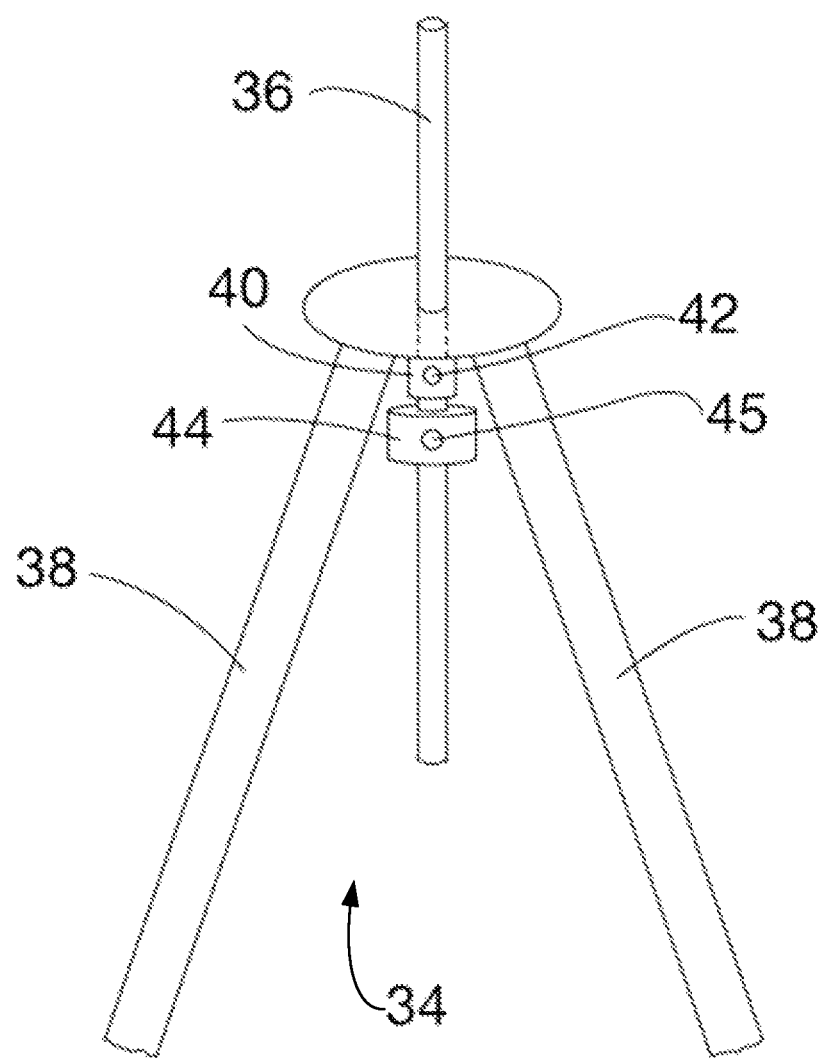

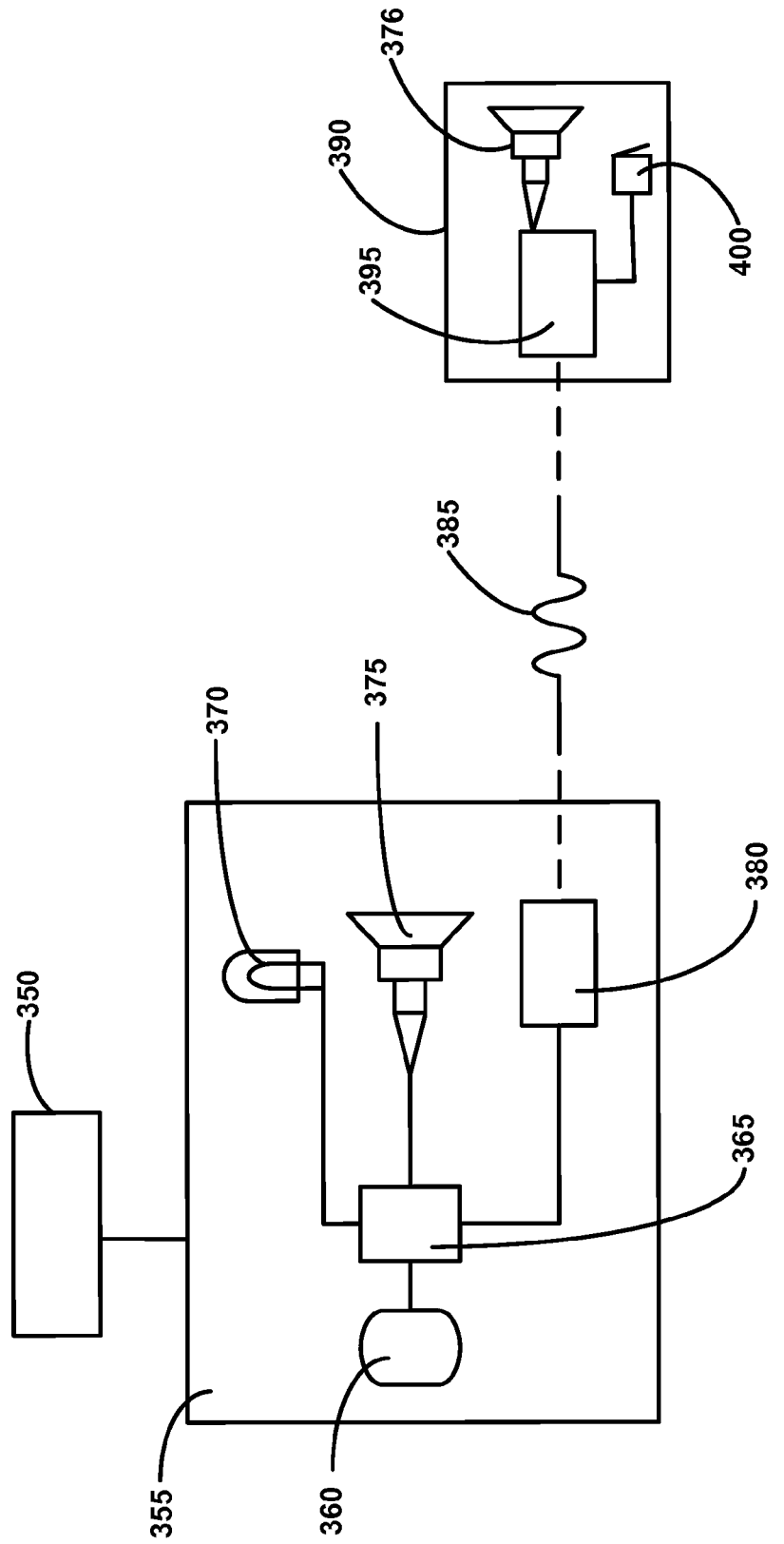

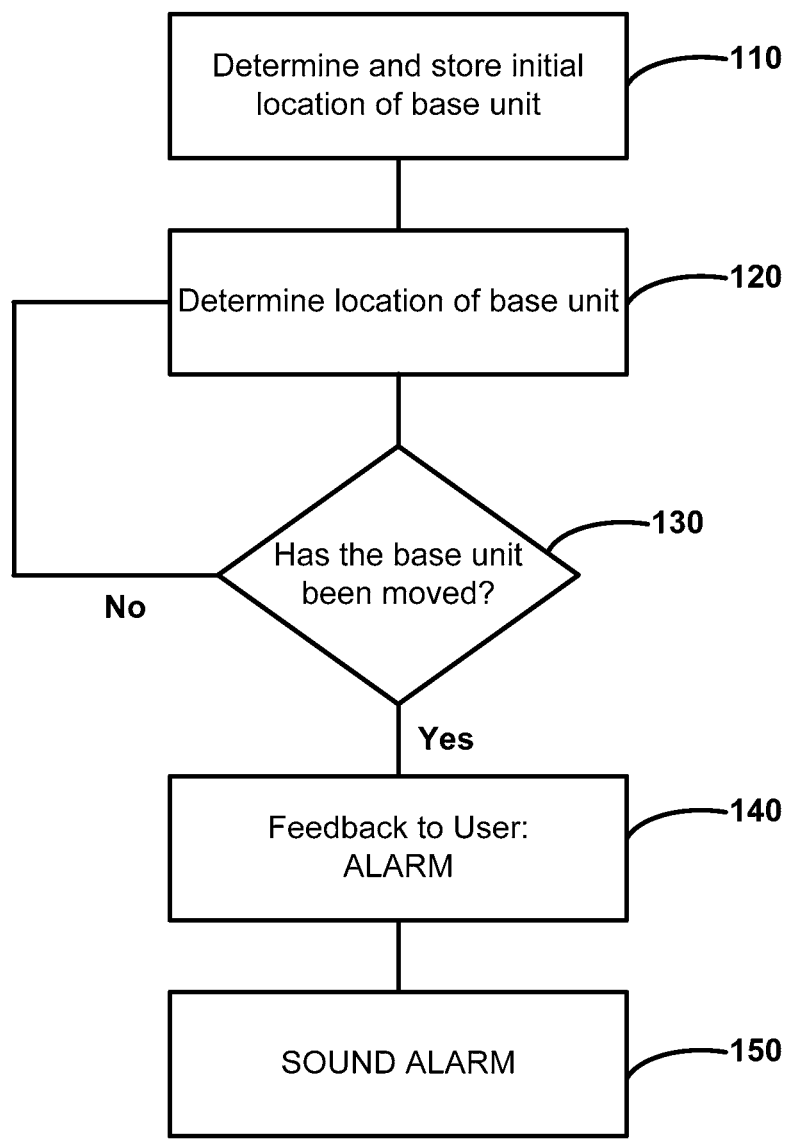

APPARATUS AND METHOD FOR SECURING A PORTABLE ELECTRONIC DEVICE

CROSS-REFERENCE TO RELATED APPLICATIONS

This application claims the benefit of U.S. Provisional Application No. 61/594,926, filed Feb. 3, 2012, the content of which is incorporated herein by this reference and is not admitted to be prior art with respect to the present invention by the mention in this cross-reference section.

BACKGROUND

Devices left unattended are susceptible to being stolen. For certain expensive devices, such as electronic devices, users are unable to use the devices unattended without a significant risk of theft. The theft problem is particularly acute in the case of electronic devices that are left unsupervised during their normal use. Most thieves are inspired by the opportunity of an unattended electronic device or other valuable device. A great need exists for anti-theft systems and methods that secure electronic devices that are unattended during use.

SUMMARY OF THE INVENTION

The present invention provides mechanical, electronic, and electromechanical devices and combinations thereof to prevent or deter unauthorized movement (i.e., theft) of portable devices that are unattended when used. Additionally, the present invention provides methods that may be employed separately or in combination to prevent or deter such unauthorized movement.

BRIEF DESCRIPTION OF THE DRAWINGS

FIG. 3 shows a top view of the screw portion of the anchoring element auger of FIG. 2.

FIG. 4 shows a bottom view of the driving portion of the anchoring element auger of FIG. 2.

FIG. 5 shows a side view of a securing screw according to a preferred embodiment of the present invention.

FIG. 6 shows a top view of the securing screw of FIG. 5.

FIG. 7 shows a top view of a tool that engages the securing screw of FIG. 5 according to a preferred embodiment of the present invention.

FIG. 8 shows a perspective view of an anchoring element bag according to a preferred embodiment of the present invention.

FIG. 9 shows a sectional view of section A-A of FIG. 8.

FIG. 10 shows a perspective view of the anchoring element bag of FIG. 8 in a cinched and locked configuration according to a preferred embodiment of the present invention.

FIG. 11 shows a perspective view of a tripod locking device according to a preferred embodiment of the present invention.

FIG. 12 shows a schematic diagram illustrating an embodiment of a security system of the present invention that uses a sensor to detect unauthorized movement of an associated device according to a preferred embodiment of the present invention.

FIG. 13 shows a flowchart illustrating a method of detecting unauthorized movement of an unattended device according to a preferred embodiment of the present invention.

DETAILED DESCRIPTION OF THE PREFERRED EMBODIMENTS

Figure 1:
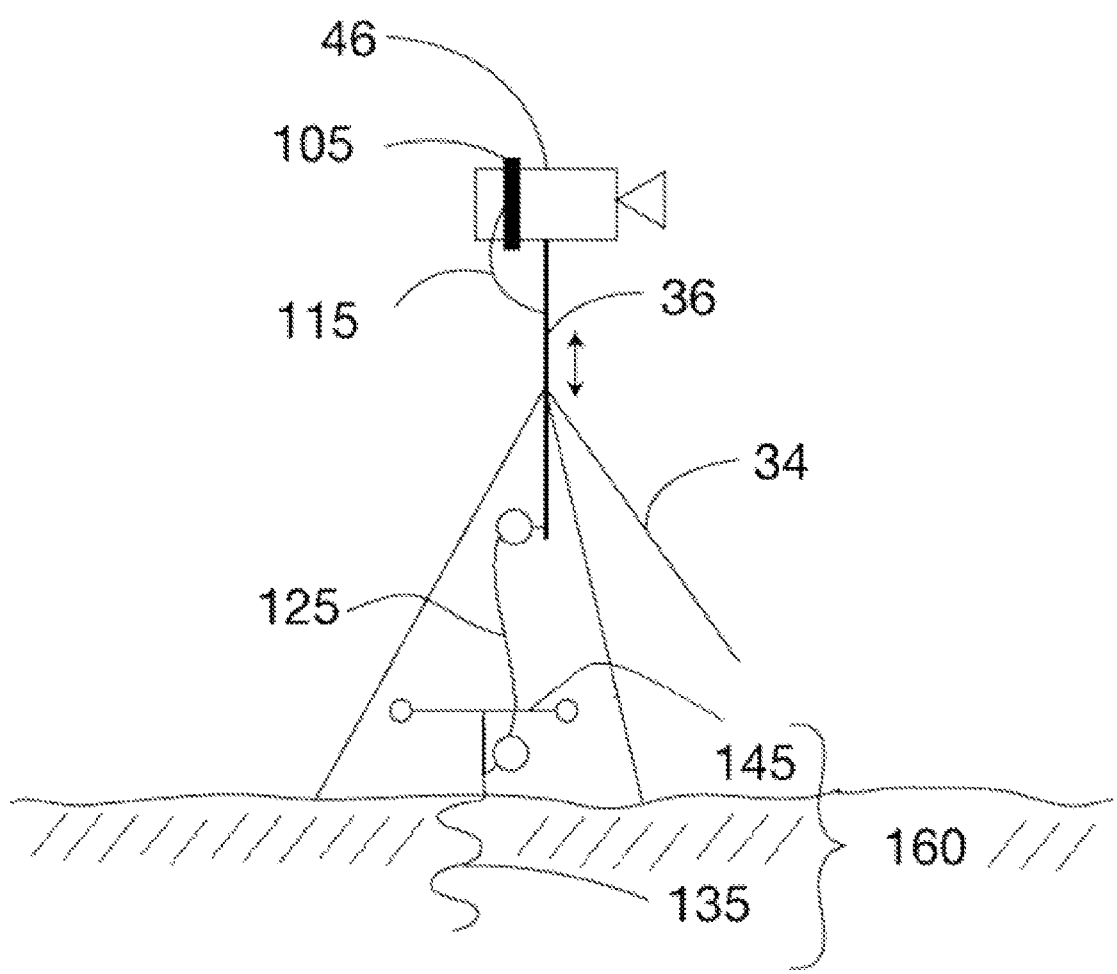
FIG. 1 shows a schematic diagram illustrating a security system for a portable electronic device according to a preferred embodiment of the present invention.

FIG. 1 shows a schematic diagram illustrating a security system for a portable electronic device according to a preferred embodiment of the present invention. More particularly, FIG. 1 shows camera 46 set up on tripod 34 for video recording some outdoor activity. Tripod 34 preferably includes mast 36 for camera height adjustment, as shown.

It is noted that there may be an additional electronic devices present and connected to tripod 34 and/or camera 46 that assist orienting the camera automatically for better recording of surfing, kiteboarding, or other such activity. An archetypical example of a device that is intended to work unattended is an "automatic cameraman" or "automatic pointing system" described in co-owned and co-pending U.S. patent application Ser. No. 13/726,380, titled "A Portable System for Automated Video Recording", U.S. patent application Ser. No. 13/726,203, titled "A Portable System for High Quality Video Recording", and PCT Application No. PCT/US2012/71565, titled "A Portable System for High Quality Video Recording", the contents all of which are hereby incorporated by reference in their entirety.

In certain environments, such as on a beach, objects to which the camera or tripod may be secured may not be present or available. For example, a nearby tree or pole may not be present or available on a beach. A similar problem may arise in other environments such as when video recording snowboarding in a wide open bowl or dirt biking in an expansive desert. The security systems of the present invention provide apparatuses and methods to secure unattended devices when available "anchors" are absent. Additionally, the security systems of the present invention provide electronic theft prevention systems as discussed further herein.

As shown in FIG. 1, and according to a preferred embodiment hereof, camera 46 is secured to tripod 34 by camera attachment device 105 and camera tether 115. Camera tether 115 may be made in a variety of ways and using a variety of materials such as chain, rope, wire, made of steel, reinforced nylon, etc.

Portable electronic devices, such as cameras, cell phones, and the like, are typically not equipped with a mechanical attachment point that may be attached to, for example, a high strength steel tether. The security system hereof preferably comprises camera attachment device 105 that, in conjunction with camera tether 115, prevents camera 46 being separated from tripod 34. The construction of camera attachment device 105 depends on the type of camera or electronic device with which the camera attachment device will connect. In one preferred embodiment, camera attachment device 150 comprises a brace that attaches to tripod 34 preferably using a modified camera securing screw (see FIG. 5) and is designed to permit full access to the camera lens and controls. The brace preferably has an open state and a closed state; when the brace is closed, the brace may be locked. The brace is preferably designed with an inner surface that has portions that, when the brace is closed, prevent movement of the camera relative to the brace in any direction.

Camera tether 115 is an example of an "intermediate tether" used to interconnect a device (camera 46) to tripod 34 which is further anchored as discussed below. Other intermediate tethers may be incorporated to interconnect various devices to other components, such as camera 46 or tripod 34.

It is noted that a camera may be fully incorporated and integrated with the "automatic cameraman" or "automatic pointing system" mentioned above and/or with the tripod.

Tripod 34 is preferably equipped with a connection point or connection points to connect camera tether 115 and tether 125 (discussed further below). Such connection point may comprise braces, hooks, lashings and the like. The connection points are preferably made of high strength material in order to prevent or make it more difficult for a potential thief to cut them.

The security system of the present invention preferably comprises anchoring element 160, as shown. Anchoring element 160 is portable. One end of tether 125 is preferably attached to anchoring element 160. When anchoring element 160 is anchored, the connection between tether 125 and anchoring element 160 makes it difficult for a thief to move tripod 34, camera 46, and any other associated securely connected devices. When appropriately set up, camera 46 may be used confidently unattended without fear of theft.

Figure 2:
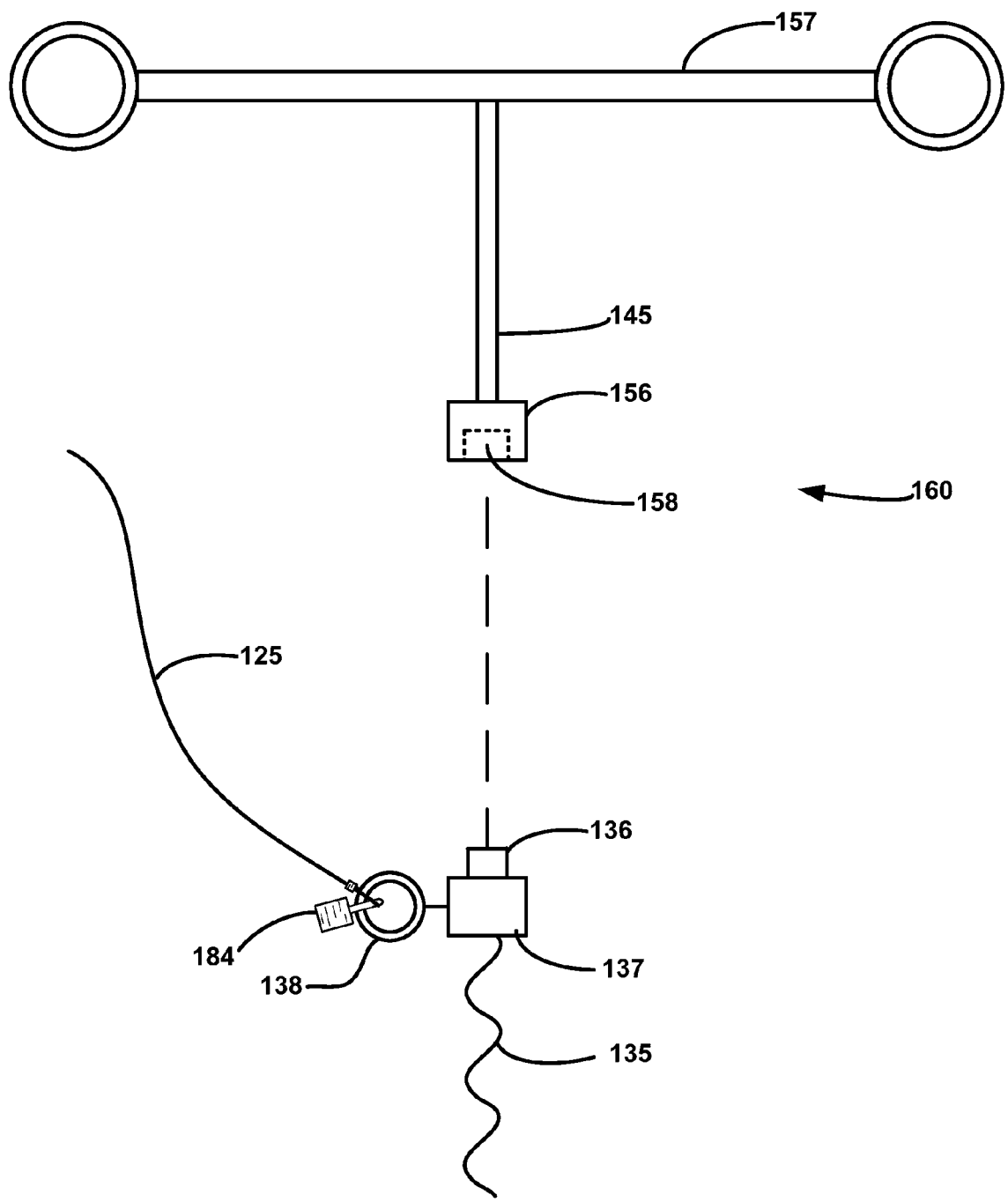
FIG. 2 shows an exploded view of an anchoring element auger according to a preferred embodiment of the present invention.

In the embodiment shown in FIG. 1, anchoring element 160 is preferably a surface piercing element, preferably an auger, comprising a screw portion 135 and a driving portion 145 having a handle, as shown. Screw portion 135 is turned by driving portion 145 to penetrate or pierce the soil, sand, or other material at the desired location of the device to be anchored. Driving portion 145 is preferably removable as shown in FIG. 2.

Anchoring element 160 is driven into the soil, sand, or other material to secure the tethered item or items. Once screw portion 135 of anchoring element 160 has been securely placed into the soil, sand, or other material, driving portion 145 is removed. With driving portion 145 removed, extraction of screw portion 135 requires a tool, thus preventing or making it difficult for a thief to steal the items attached to the screw portion 135 with tether 125. Thus, the items connected to tether 125 are attached to an object that is difficult to move.

In one preferred embodiment, the removed driving portion 145 is preferably attached to tripod 34 and locked so that one does not have to carry driving portion 145 while the devices and components being secured are unattended. In one preferred embodiment, driving portion 145 is locked onto tripod 34 using a securing screw of the type show in FIG. 5. In another preferred embodiment, an intermediate tether may be used to connect driving portion 145 to tripod 34.

In one preferred embodiment, driving portion 145 has a four-sided opening that connects with a corresponding element or projection of screw portion 135. When driving portion 145 is removed, screw portion 135 cannot be turned without an appropriate tool or wrench. Alternatively, driving portion 145 may have a three-sided or five-sided opening (or other multi-sided opening) with a corresponding portion on screw portion 135. The corresponding pieces fit together in a lock-and-key connection. Such an arrangement has an additional theft-prevention advantage in that three-sided or five-sided tools are not commonly available. A "three-sided" lock-and-key embodiment of driving portion 145 and screw portion 135 is shown in FIGS. 3 and 4.

FIG. 2 shows an exploded view of an anchoring element auger according to a preferred embodiment of the present invention. FIG. 3 shows a top view of the screw portion of the anchoring element auger of FIG. 2. FIG. 4 shows a bottom view of the driving portion of the anchoring element auger of FIG. 2.

Driving portion 145 preferably comprises central portion 156, as shown. Handle 157 is preferably connected to central portion 156, as shown. Central portion 156 preferably comprises a triangular-shaped opening 158 (see FIG. 4) that matches triangular-shaped end portion 136 of screw portion 135 (see FIGS. 2 and 3) of anchoring element 160. Triangular-shaped end portion 136 preferably projects upward from central portion 137 of screw portion 135, as shown. Tether attachment ring 138 is securely connected with central portion 137, as shown. Tether 125 is connected to tether attachment ring 138, as shown. A locking mechanism 184 connects tether 125 to tether attachment 138 to prevent removal of tether 125, as shown. A similar locking mechanism may be used at the point with which tether 125 is connected with mast 36 (and at other points as desired to securely attach various devices). Locking mechanism 184 may be a pad lock, a combination lock, an electronic lock, a biometric lock, etc. Once so connected, and with reference to FIG. 1, tether 125 is securely connected to anchoring element 160.

Screw portion 135 and driving portion 145 preferably comprise correspondingly-shaped male and female parts, as shown. As noted above, other geometric configurations for the opening on driving portion 145 and projection on screw portion 135 may suffice. It is further noted that screw 135 portion may contain the opening while driving portion 145 may contain the projection that fits into such opening. When the driving portion and screw portion are connected, appropriate torque may be applied to handle 157 of driving portion 145 to install and remove anchoring element 160.

FIG. 5 shows a side view of a securing screw according to a preferred embodiment of the present invention. FIG. 6 shows a top view of the securing screw of FIG. 5. FIG. 7 shows a top view of a tool that engages the securing screw of FIG. 5.

The removable driving portion 145 may be used for securing camera 46 on tripod 34 (or other components) using a securing screw when the configuration of the securing screw corresponds to the geometric configuration of the opening of driving portion 145. Commercially available tripods generally have multiple securing screws that have a threaded part and a handle part. The handle part is typically a wing nut or is round in shape. According to a preferred embodiment of the present invention, securing screw 50 is provided with three-sided turning end 52. Tool 60 comprises a matching opening 62 to engage turning end 52 of securing screw 50 and assists tightening and loosening of securing screw 50. According to other preferred embodiments hereof, the end of securing screw 50 may be made with other configurations such as four-sided ends or five-sided screw ends. Tool 60 preferably has knurled rim around edge 64 for easier handling.

The above-described preferred embodiments are suitable for those environments where the soil or ground may be penetrated relatively easily with an auger (anchoring element 160). In some environments, such as very rocky environments, insertion of an auger may not be feasible. The security systems of the present invention comprise an alternative apparatus and method of securing an unattended device. In such an alternatively preferred embodiment, tether 125 (connected to tripod 34) is preferably connected to a preferably flexible container or bag. Tether 125 is preferably locked to the flexible container or bag using a locking mechanism similar to that shown in FIG. 2 to prevent removal of the tether from the flexible container or bag (a portable anchoring element). The flexible container may be filled with material found at the location. The material may be water, rocks, pebbles, sand, snow, etc. The flexible container may be used with or without auger 135.

The flexible container is preferably made of durable material that is difficult to cut open. The flexible container may also double as a travel bag that could hold, for example, the camera, tripod, and other items for transportation to a beach or other sporting venue.

FIG. 8 shows a perspective view of an anchoring element bag according to a preferred embodiment of the present invention. FIG. 9 shows a sectional view of section A-A of FIG. 8. FIG. 10 shows a perspective view of the anchoring element bag of FIG. 8 in a cinched and locked configuration according to a preferred embodiment of the present invention.

In the preferred embodiment shown in FIGS. 8-9, the anchoring element is embodied as bag 200. According to preferred embodiments of the present invention, bag 200 may have handles, pockets, and other features not shown. Bag 200 is shown in an open position in FIGS. 8 and 9. As noted above, bag 200 is fillable with material by way of opening 230. Bag 200 is portable.

With reference to FIG. 9, bag 200 preferably comprises outside surface 210 and inside surface 220, as shown. Inside surface 220 of bag 200 is accessible via opening 230. The wall thickness between outside surface 210 of bag 200 and inside surface 220 of bag 200 is sufficient to make the bag resistant to tearing or cutting. Bag 200 preferably comprises neck portion 215 where the thickness of inside surface 220 and outside surface 210 is reduced compared to other portions of bag 200. This portion of bag 200 is preferably narrow relative to other portions of bag 200 so that bag 200 may be easily bunched together for closing.

In FIG. 10, bag 200 is shown closed using a tightening belt or brace 240 (a bag-closing mechanism) and locked with lock 250 (a bag-locking mechanism). It is noted that tether 125 may be connected to and locked with lock 250. With tightening belt or brace 240 tightened around narrow neck portion 215 there are no loose portions, as shown. This prevents the removal of tightening belt or brace 240 from bag 200. As described above, tether 125 may be connected to lock 250 or secured to brace 240 prior to tightening brace 240, etc.

Bag 200 is preferably easy to fill and may be quickly filled. With tightening belt or brace 240 locked with lock 250, tightening belt or brace 240 cannot slide off bag 200. Thus, bag 200 may be used as a weight to anchor and secure an unattended device connected to bag 200 with tether 125. The weighted bag is an object that is difficult to move.

Bag 200 is preferably constructed of wire reinforced nylon, vinyl, or similar material. Bag 200 is preferably waterproof and even capable of holding water.

FIG. 11 shows a perspective view of a tripod locking device according to a preferred embodiment of the present invention. In the preferred embodiment shown in FIG. 11, tripod legs 38 of tripod 34 are locked in an open position. For clarity, FIG. 11 only shows two tripod legs. With the tripod legs locked in an open position, a thief who steals the tripod is unable to collapse the tripod legs making transport awkward. This embodiment is another alternative to the principle of making the theft difficult by attaching the device that is to be protected from theft to an object that is difficult to move. Mast 36 of tripod 34 is locked in a fixed position using securing screw 42, as shown. Securing screw 42 is preferably of the type shown in FIG. 5. Cylindrical element 40 holding securing screw 42 is standard on most tripods and is firmly integrated with the body of the tripod. Second cylindrical element 44, when unsecured, may slide up or down mast 36. When second cylindrical element 44 is moved to its topmost possible position, as shown in FIG. 4, second cylindrical element 44 prevents legs 38 of tripod 34 from collapsing thus keeping the tripod legs in an open position. Second cylindrical element 44 keeps the tripod legs in an open position by having a thickness which prevents closing of the tripod legs. Second cylindrical element 44 is secured in place to mast 36 using securing screw 45. Securing screw 45 is preferably of the type shown in FIG. 5.

In addition to the mechanical security implements described above, non-mechanical features, such as alarms, are also preferably implemented to alert the user or responsible person to a theft incident. To accomplish this, devices may be added to the electronic device being protected. Alternatively, new functions are added to some components of the device to be protected. According to one preferred embodiment of the present invention, a base unit associated with the tripod or device to be protected (or both) preferably comprises a position sensor and a signaling device. The position sensor is used to detect unauthorized movement of the device being protected. The position sensor may be a global positioning device, an electronic level, an electronic compass, an accelerometer, a magnetometer, etc. A signaling device is configured to provide an alarm signal when such unauthorized movement has been detected.

As noted above, the base unit is preferably associated with a device being protected (or multiple devices). In this regard, the base unit is either integrated with the device being protected or attachable to it.

In one preferred embodiment, the signaling device comprises a sound emitter located at a base unit. In such an embodiment, the signaling device emits an alarm signal in the form of an audible sound when the signaling device is activated. The emitted sound is intended to draw the attention of nearby bystanders to the thief.

In another preferred embodiment, in addition to the signaling device located at the base unit, another signaling device is associated with a remote unit carried by or otherwise collocated with a user who will be positioned at a location away from the electronic device being protected. The remote unit signaling device preferably emits an alarm signal in the form an audible alarm sound. In such an embodiment, the base unit and the remote unit are communicatively coupled. In one preferred embodiment, the base unit and remote unit are communicatively coupled by way of radio communication. When the signaling device of the base unit and the signaling device of the remote unit are activated, a command is communicated to the base unit to activate an alarm signal and to the remote unit to activate an alarm signal, both preferably in the form of an audible alarm. In such an embodiment, the user is alerted that an unauthorized movement of the base unit has occurred. According to another preferred embodiment hereof, the remote unit may comprise a signaling device in the form of a vibratory element which causes the remote unit to vibrate when activated. Such vibratory element may alone or in combination with the audible alarm signaling device.

According to another preferred embodiment hereof, a signaling device may only be present in a remote unit.

According to a preferred embodiment hereof, the position sensor may be an inertial sensor, such as an accelerometer or gyroscope. According to another preferred embodiment hereof, the position sensor may be a global positioning device. According to another preferred embodiment hereof, the position sensor may be an electronic level. According to another preferred embodiment hereof, the position sensor may be an electronic compass. According to another preferred embodiment hereof, the position sensor may be a magnetometer.

FIG. 12 shows a schematic diagram illustrating an embodiment of the security system of the present invention that utilizes electronic motion detection according to a preferred embodiment of the present invention. Base unit 355 is preferably connected to or associated with a device 350 that is being protected. The device that is being protected may be a camera, an "automatic cameraman", a tripod, etc. Base unit 355 is connected to device 350 in a way such that movement that changes the location and/or the orientation and/or that accelerates device 350 is sensed by sensor 360, a component of base unit 355. Base unit 355 is preferably appropriately powered and is preferably equipped with a processing unit 365 that facilitates the operation of its components. Sensor 360 may be a single sensor or a combination of different sensors. If sensor 360 detects movement (i.e., change of location, orientation, or acceleration) of the device 350, an electric signal is sent to the signaling component, or components of base unit 355. In FIG. 12, two signaling devices are shown, light source 370 and sound source 375. According to some preferred embodiment, the rest of the components shown in FIG. 12 may be omitted.

In a preferred embodiment, the alarm system of FIG. 12 comprises remote unit 390 which is preferably located with the user/owner of device 350 that is being protected. Base unit 355 and remote unit 390 are both equipped with communication devices. In one preferred embodiment, base unit 355 comprises radio transceiver 380, as shown. Radio transceiver 380 of base unit 355 sends and receives radio signals 385 to and from a transceiver/processor 395 of remote unit 390. If sensor 360 detects movement of device 350, an electric signal is sent to the signaling component in remote unit 390. In FIG. 12, two signaling devices are shown, sound source 376 (which emits sound or a siren on receipt of the electric signal) and vibratory element 400 (which vibrates to alert the user).

FIG. 13 shows a flowchart illustrating a method of detecting unauthorized movement of an unattended device according to a preferred embodiment of the present invention. After the base unit is turned on, the initial location of the base unit is obtained by an associated global positioning device and stored (step 110). Once the initial location is stored, the global positioning device continuously receives location data and continuously updates its location at a pre-determined frequency (for example, at a frequency of five times per second) (step 120). In step 130, the subsequent location updates are then compared to the initial location stored. If the distance of the current location is determined to be greater than a certain pre-determined distance from the initial stored location, an unauthorized movement is considered to have occurred. If the positioning sensor detects such unauthorized movement, the user is preferably alerted by a signal device of the remote unit in step 140 and an alarm will sound in the base unit in step 150.

According to another preferred embodiment, the user may be alerted to unauthorized movement by way of a light source (such as a light emitting diode or LED). For example, according to one preferred embodiment, a light source may be illuminated when the system is operating normally; if unauthorized movement is detected, the LED is no longer visible to the user. In such an embodiment, the alarm at the remote unit may not be included.

It is noted that step 140 and step 150 may occur in reverse order or simultaneously. The system preferably comprises methods and systems to arm the alarm and disarm the alarm.

Global positioning technology is commonly utilized for various purposes such as the determining the location of cars for navigation purposes. One form of global positioning technology is GPS (which stands for Global Positioning System). Several different systems exist that work on a similar principle of receiving signals from satellites and use a combination of known satellite locations and time-delay measurements to determine satellite-to-receiver distances. These systems may further employ trigonometry-based methods to determine the location of a receiver in an earth-based, earth-fixed (ECEF) coordinate system. Further, satellite systems may be complemented or even replaced by earth-based signal sources. The invention hereof may be practiced using receivers (antennas) of any fully or partially satellite-based positioning system, including also fully earth-based systems. Such systems and their elements will be referred to herein for convenience as global positioning technology, global positioning devices, global positioning units, global positioning receivers, or global positioning antennas.

Global positioning devices provide location data with limited accuracy. For any particular brand of global positioning devices the typical error interval is known or can be experimentally determined and may have an error interval on the order of a few inches to several feet depending on the sophistication and the expense of the device. The geometrical perimeter of the space within which the location of a global positioning unit is uncertain is referred to as its error bubble. In step 130, movement is detected when the base unit is outside of the error bubble if the center of the error bubble is the initial location of the global positioning device. There is a finite probability of erroneous location determination by a global positioning device and such errors could result in false alarms. It is therefore useful to implement a procedure that establishes that more than one consecutive global positioning location data point must be obtained showing movement, i.e., being outside the error bubble around the original location of the base unit, before the alarm is activated. If, for example, three consecutive location data are required and the GPS update rate is five times per second, this will delay the alarm by 0.6 seconds. Preferably, the user may set this according to his or her preferences, balancing the inconvenience of false alarms against the advantage of being notified of an alarm-causing event faster. The size of the error bubble may be reduced by averaging the location data of a stationary global positioning device over time. The alarming procedure may also preferably include a rule for reducing the error bubble for detection of unauthorized movement over time, making the protection more efficient.

Figure 14:
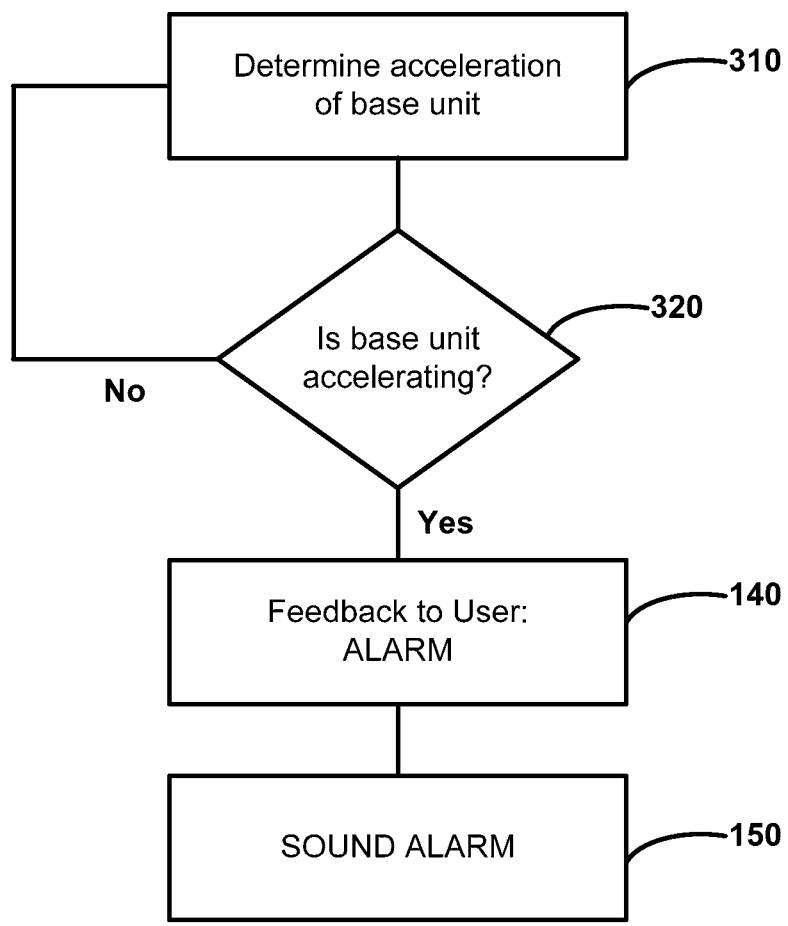
FIG. 14 shows a flowchart illustrating another method of detecting unauthorized movement of an unattended device according to a preferred embodiment of the present invention.

FIG. 14 shows a flowchart illustrating a method of detecting unauthorized movement of an unattended device according to a second preferred embodiment of the present invention. According to this preferred embodiment, the base unit is preferably equipped with an accelerometer. If the device to be secured is not intended to be moved while being used, no acceleration should be detected by the accelerometer, step 310. If that is the case (step 320, option "no"), the accelerometer continues monitoring the status of the device. If acceleration is observed (step 320 option "yes"), the alarm is triggered as described above with respect to FIG. 13 (steps 140 and 150).

The "automatic cameraman" referenced above is an example of a device that is intended to turn a camera in various directions in the course of normal use. In the embodiment of FIG. 14, it is important that the accelerometer be mounted such that it is not subject to the same or similar movements as the camera if an accelerometer is used to secure the "automatic cameraman". For example, the accelerometer may be mounted on the tripod that holds the "automatic cameraman".

According to another preferred embodiment, the sounding of the alarms is triggered by unauthorized movement detected by a device that is sensitive to the spatial orientation of the electronic device being monitored. In one preferred embodiment, the device that is sensitive to the spatial orientation of the electronic device is an electronic level. In another preferred embodiment, the device that is sensitive to the spatial orientation of the electronic device is an electronic compass. The device sensitive to the spatial orientation of the electronic device being monitored is preferably armed by the user before he or she leaves the location of the device that has to be secured. When used to secure a device that is intended to change position during normal use (e.g., the positioning device of an "automatic cameraman"), the device that senses spatial orientation is preferably mounted on a portion of the device that is not subject to change of orientation. For example, the electronic level or electronic compass may be mounted on the tripod that holds the "automatic cameraman".

All the devices mentioned above, including global positioning units, accelerometers, electronic levels, electronic altitude sensors, and the like are motion sensors and may be used to alert the user of an unauthorized movement of the device that is to be protected.

Different preferred embodiments, methods, applications, advantages, and features of this invention have been described above; however, these particular embodiments, methods, applications, advantages, and features should not be construed as being the only ones that constitute the practice of the invention. Indeed, it is understood that the broadest scope of this invention includes modifications. Further, many other applications and advantages of applicant's invention will be apparent to those skilled in the art from the above descriptions and the below claims.

What is claimed is:

1. An apparatus for providing protection against unauthorized movement of an unattended device, said apparatus comprising: at least one tether; at least one portable anchoring element; and at least one locking mechanism; wherein said at least one tether connects the device to said at least one portable anchoring element and said at least one locking mechanism prevents removal of said at least one tether; wherein said at least one portable anchoring element comprises at least one surface piercing element; wherein said at least one surface piercing element comprises at least one surface piercing portion and at least one removable driving portion; wherein said at least one surface piercing portion and said at least one removable driving portion connect by way of a correspondingly-shaped lock-and-key connection; said apparatus further comprising a tripod connectable with the unattended device, said tripod having tripod legs, said tripod equipped with a device that prevents the tripod legs from being closed and wherein said device that prevents the tripod legs from being closed is lockable with a locking element, said locking element configured to be unlocked with a tool, a portion of said tool comprising a shape that corresponds with a portion of said locking element, to prevent unlocking of said locking element without said tool with fingers.

2. The apparatus of claim 1, further comprising one or more intermediate tethers to interconnect additional unattended devices.

3. The apparatus of claim 1 wherein the tripod comprises a tripod mast and said device that prevents the tripod legs from being closed is attachable to the tripod mast.

* * * * *